United States Patent [19]
Edmonds et al.

[11] Patent Number: 5,881,655
[45] Date of Patent: Mar. 16, 1999

[54] PROCESS AND APPARATUS FOR PLANTING PLANTLETS

[76] Inventors: Timothy Kent Edmonds, 81 Tangmere Cr, Halifax, Nova Scotia, Canada, B3M 1K2; Robert Leo Cervelli, 42 Church Street, Dartmouth, Nova Scotia B34 1B1, Canada

[21] Appl. No.: 513,751
[22] PCT Filed: Mar. 2, 1993
[86] PCT No.: PCT/CA93/00084
  § 371 Date: Oct. 18, 1995
  § 102(e) Date: Oct. 18, 1995
[87] PCT Pub. No.: WO94/19927
  PCT Pub. Date: Sep. 15, 1994
[51] Int. Cl.⁶ .............................. A01C 00/00; A01G 31/00
[52] U.S. Cl. .............................................. 111/105; 47/901
[58] Field of Search ................... 47/1.01 R, 58, 47/73, 77, 87, 901; 111/100, 101, 104, 105

[56] References Cited

U.S. PATENT DOCUMENTS

| | | | |
|---|---|---|---|
| 3,337,986 | 8/1967 | Boucher | 47/901 X |
| 4,215,513 | 8/1980 | Dedolph | 111/105 X |
| 4,660,479 | 4/1987 | Crisio, Jr. et al. | 111/105 |
| 4,788,920 | 12/1988 | Shaw | 111/105 |
| 4,947,579 | 8/1990 | Harrison et al. | 111/105 X |
| 5,488,802 | 2/1996 | Williams | 47/901 X |

FOREIGN PATENT DOCUMENTS

| | | |
|---|---|---|
| 0 086 918 | 8/1983 | European Pat. Off. . |
| 2 593 777 | 2/1986 | France . |
| 2 014 024 | 8/1979 | United Kingdom . |

*Primary Examiner*—Thomas B. Will
*Assistant Examiner*—Robert Pezzuto
*Attorney, Agent, or Firm*—Jones, Tullar & Cooper, P.C.

[57] ABSTRACT

Plantlets from a bare-root, cutting or tissue culture condition are automatically planted into a nursery container. The apparatus creates a continuous supply of V-shaped notches in planting substrate, into which plantlets are placed and then the substrate is closed about the roots, creating a "sandwich" or "book" effect. The resulting plug members with the substrate closed around the plants roots or stem are automatically transplanted into a nursery container for subsequent growing. Plantlets with small roots are quickly and efficiently placed in the substrate without injury or transplant shock. The apparatus is particularly useful for small plantlets or early stage germinants that have both roots and shoots (such as tissue culture material derived from either micropropagation or somatic embryogenesis) but it can also be used with rooted or unrooted cuttings, true or synthetic seed or naked embryos.

10 Claims, 14 Drawing Sheets

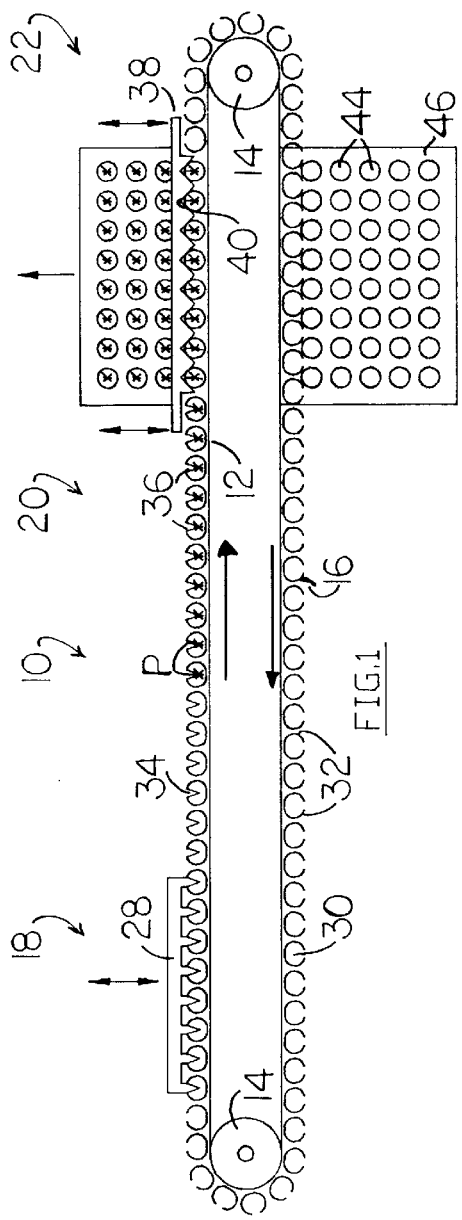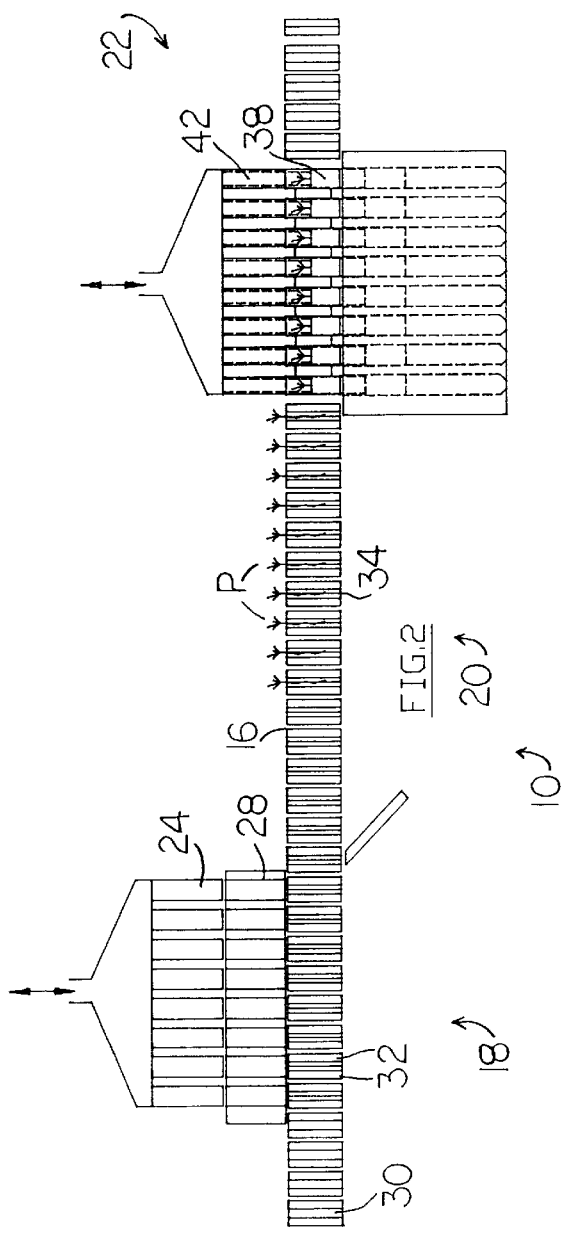

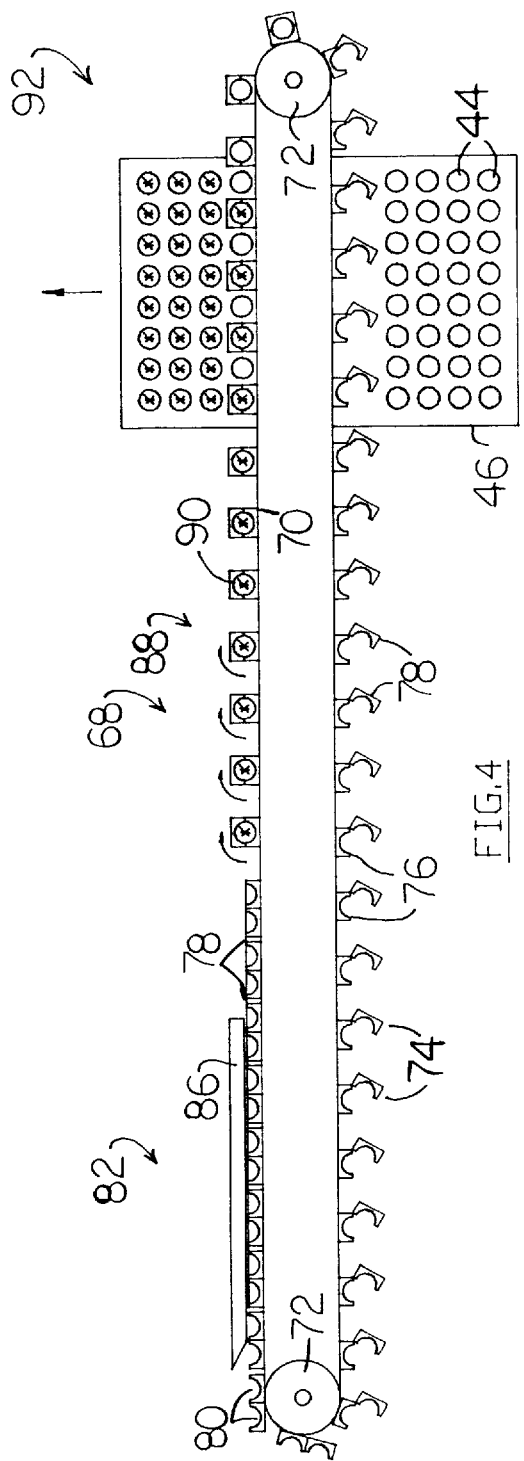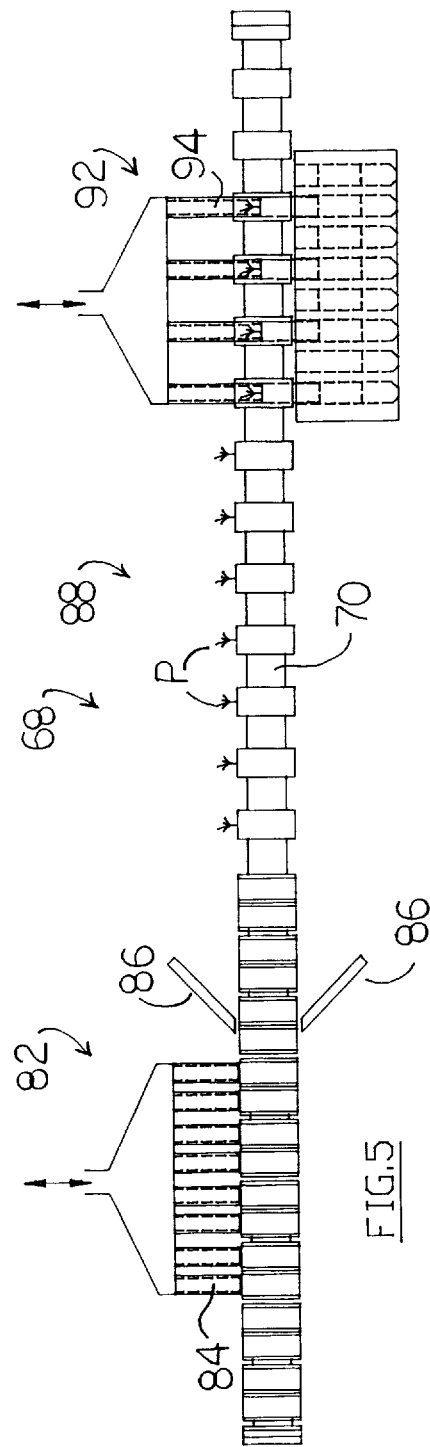

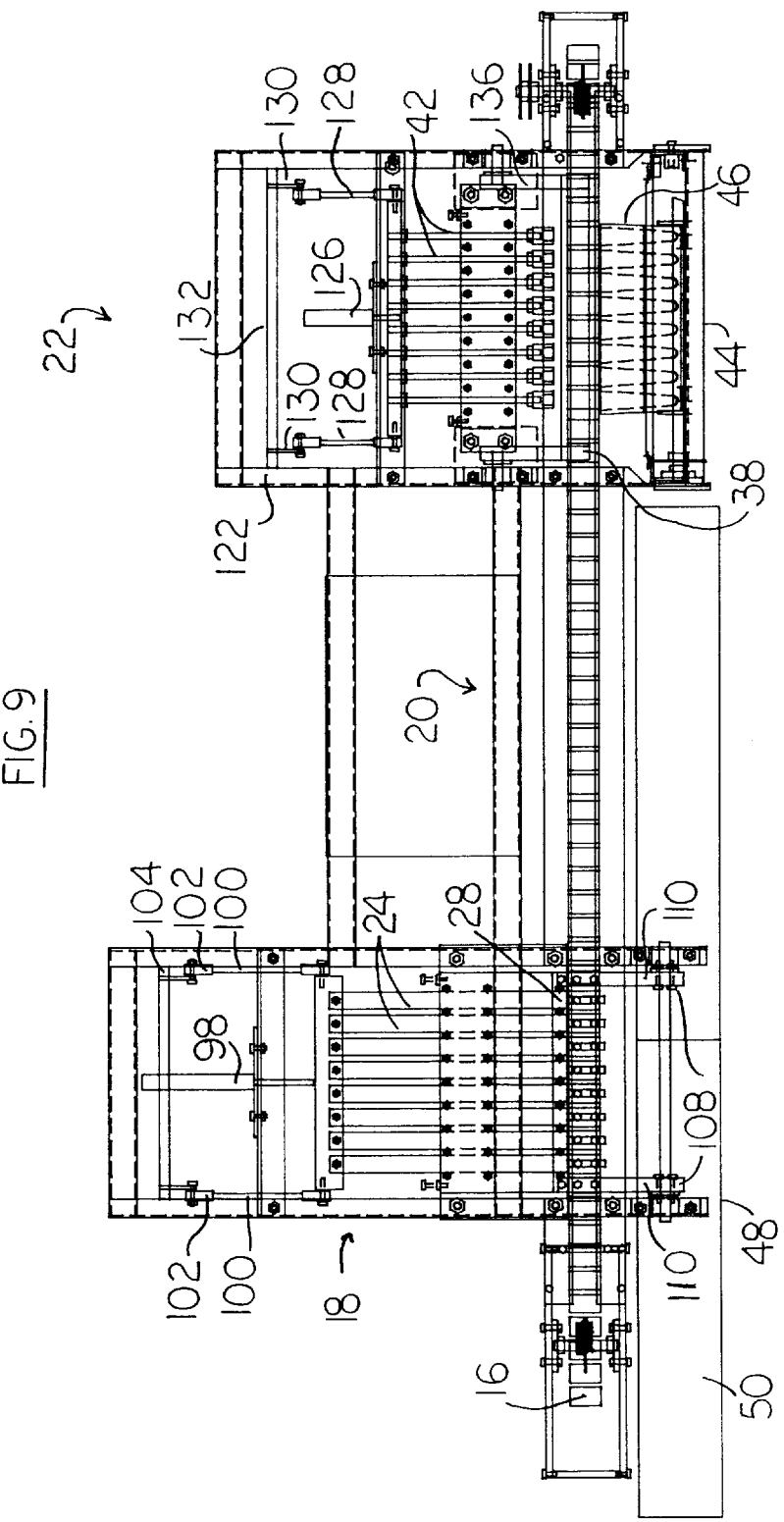

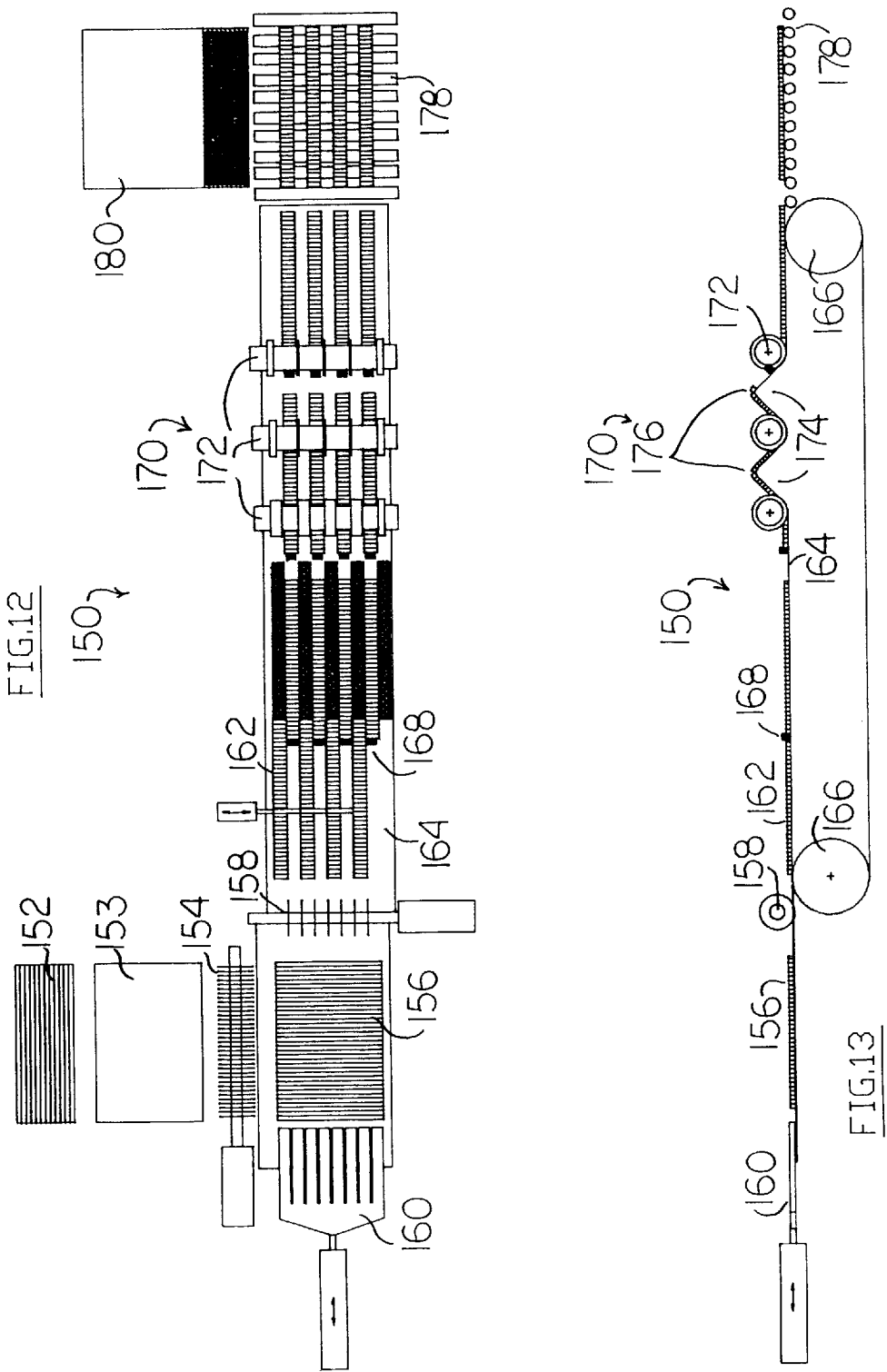

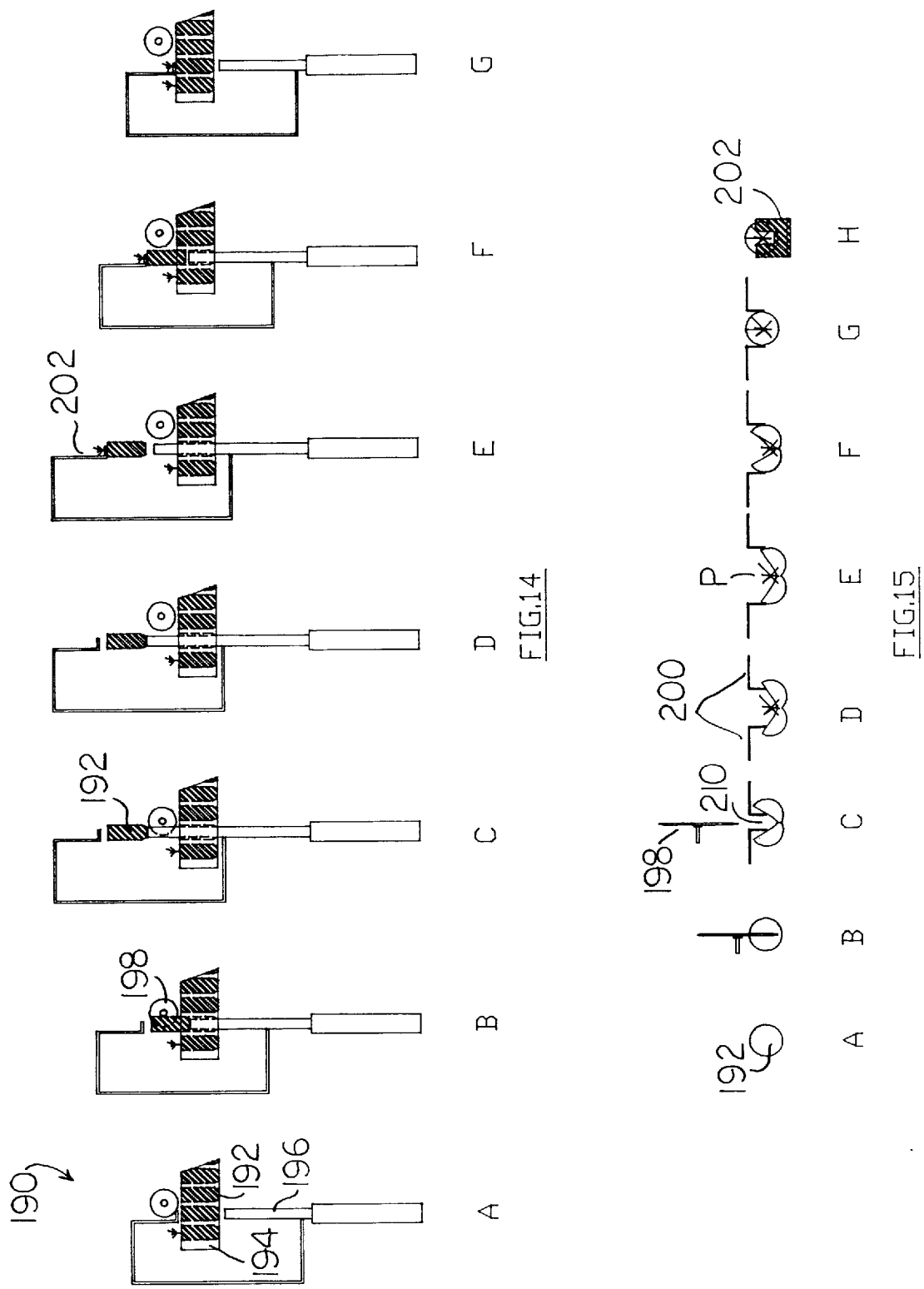

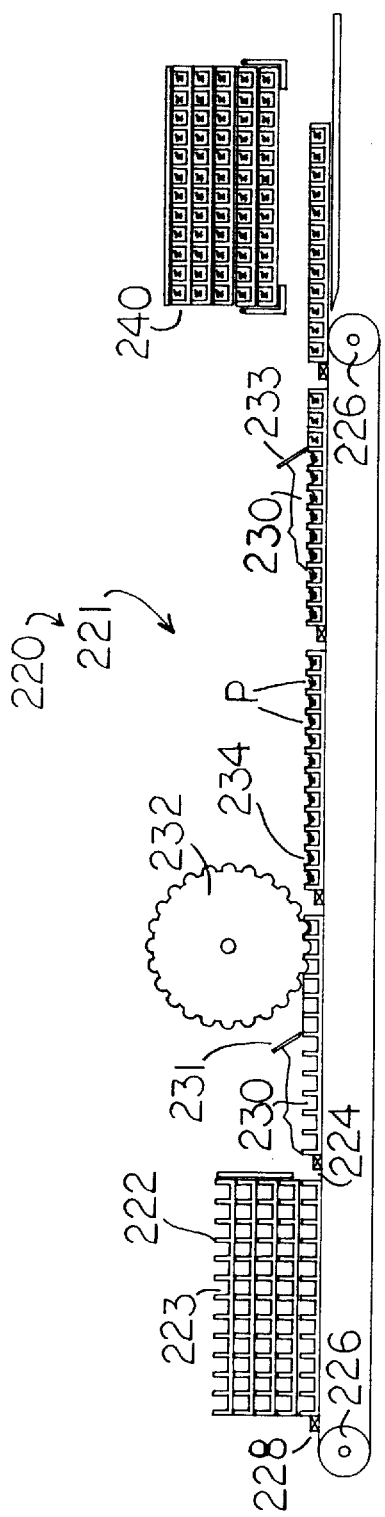
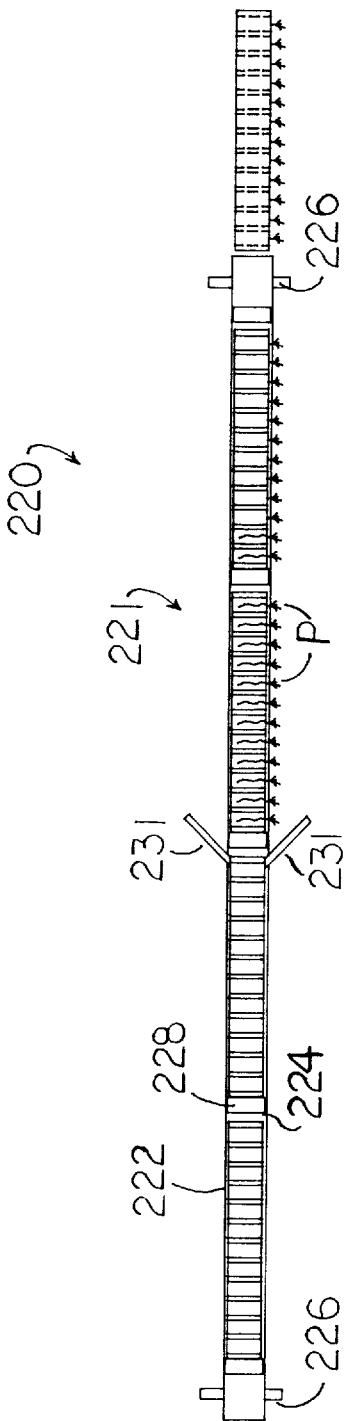

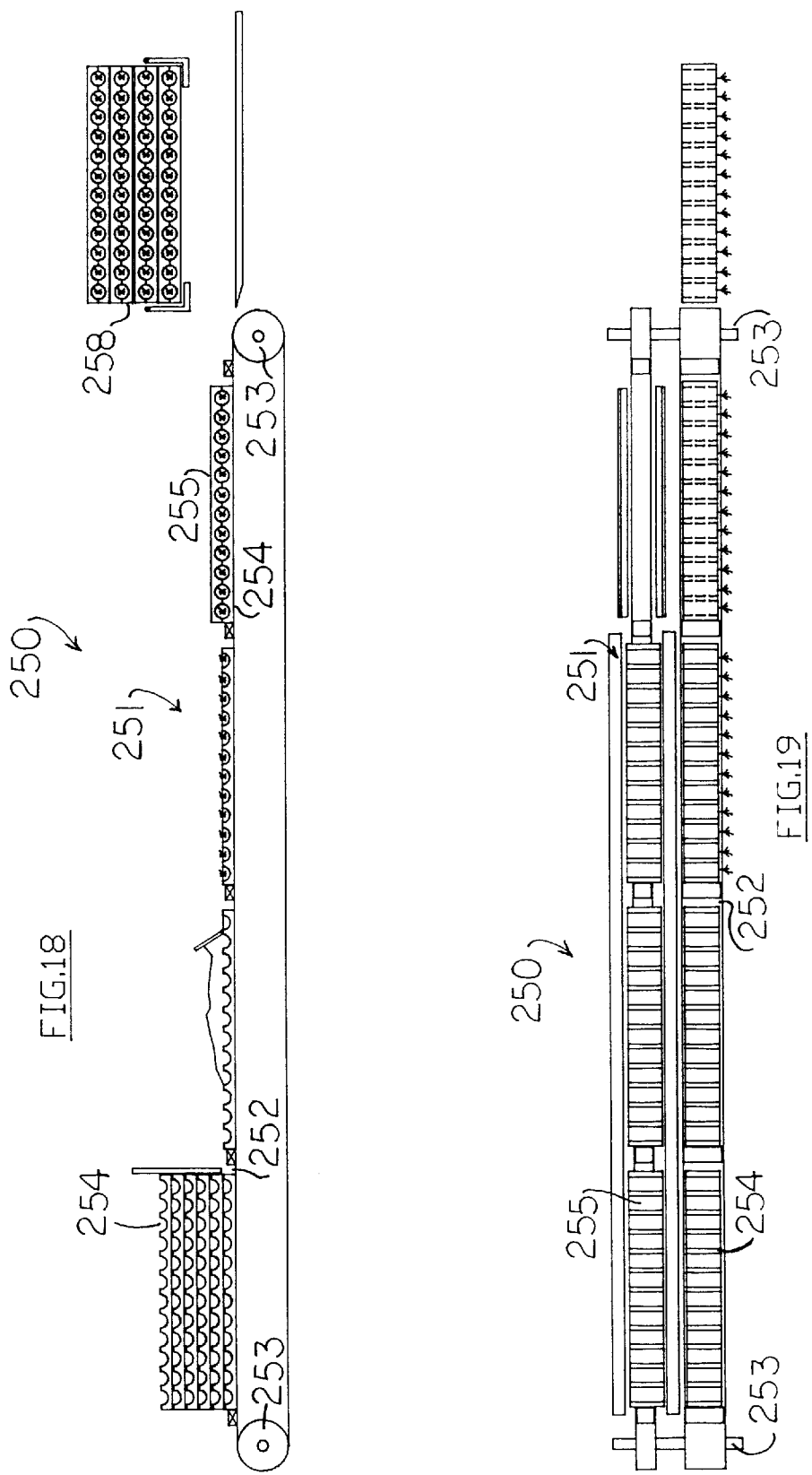

PROCESS AND APPARATUS FOR PLANTING PLANTLETS

DEFINITIONS

COTYLEDONS The original embryonic leaves or needles at germination, or "seed leaves", on the top of a very small plantlet.

CUTTING Whether rooted or unrooted, a stem section or shoot tip removed from a parent plant (non-tissue culture propagation technique).

DIBBLE HOLE A hole placed into substrate in a pot or planting tray. Facilitates planting or transplanting into the substrate.

EMBLING A plantlet generated from a somatic embryo, analogous to a seedling, which is generated from a seed (also called somatic seedling).

EPICOTYL The stem of the plant below the cotyledons.

EX-VITRO Out of the sterile environment.

HYPOCOTYL The stem of the plant from the root collar up to the cotyledons.

IN-VITRO In a sterile environment.

MEDIUM An agar or gel solidified solution which supports and transfers moisture and nutrients to small plants growing in tissue culture.

MICROCUTTING A cutting produced from tissue culture propagation.

MICROPROPAGATION The tissue culture process of propagating plant material by shoot multiplication. Each of the resultant "microcuttings" must be rooted either in vitro or ex vitro before it grows into a new plant.

PLANTING TRAY A tray or substrate container with or without individual plug holes. A STYROBLOCK™ is a planting tray made of styrofoam. The tray can be made of any material but mostly plastic and styrofoam are used. Other names include: nursery tray, plug tray or container, planting tray, multipot or tray. The styroblocks being used have 112 plug holes, 8 across 14 down, but the new machine can be adapted to any size or style of tray.

PLANTLET A small plant, regardless of origin.

PLUG MEMBER A v-notched or open sandwich or open book preparation of substrate to be used as a plantlet receiving area.

PROPAGULE Any plant structure which is capable of regenerating into a whole plant, includes seed, embryos, corms, bulbs, tubers, etc.

ROOT COLLAR The junction between the root and the hypocotyl or stem. The start of the root, or the point where the plant should emerge from the soil.

SOMATIC EMRYOGENESIS The tissue culture process of producing embryos from vegetative or non-sexual cells.

SYNTHETIC SEED A somatic embryo, either naked or encapsulated with a nutrient or protective coating, either desiccated or undesiccated, and prepared for germination like true seed.

SUBSTRATE Another name for potting mix, can also include cellulose materials, various foams, any mixture of perlite, vermiculite, wood fibers, bark, peat moss fertilizers, sand, rock wood, soil, loam or humus.

TISSUE CULTURE The process of using agar medium in an in-vitro environment to propagate and grow plant cells, tissue or organs.

BACKGROUND OF THE INVENTION

Numerous situations exist in the greenhouse and nursery industry where small plantlets or early stage germinants must be planted into plug containers when coming from a bare-root or unpotted condition. All currently existing growing systems involve planting this material, or true seed, directly into pre-filled containers. The substrate in such containers may contain dibble holes (pre-formed planting holes) to accept plant material with less injury. Unrooted cuttings, for example, are typically stuck directly into containerized substrate for rooting purposes. A wide variety of containers exists for these purposes, of different sizes, density, growing medium, etc. In cases where pre-rooted plantlets must be planted into these container systems, the existence of the root poses problems at the point of inserting the plantlet into the substrate, even if a dibble hole exists. Excessive root damage or root bending may occur, even with the careful use of hand-planting tools, possibly creating transplant shock and a reduction in growth. In addition, hand planting material in this fashion can be very time consuming and costly. There therefore exists a need for automated equipment capable of quickly effecting the placement of plantlets into plug containers without damage to the plantlets, and in particular without damage to the delicate root systems thereof.

SUMMARY OF THE INVENTION

The present invention overcomes the above disadvantages by enabling the planting operator to quickly and accurately place the root-portion of a plantlet into an open plantlet-receiving area of a plug member formed of pre-moistened substrate, which area is then mechanically closed prior to automatic transplantation. The invention creates a continuous supply of V-notches or open "sandwiches" or "books" of potting substrate, into which plantlets are placed, which then are closed around the plant roots or stem prior to automatic transplantation into a nursery container. The invention especially enables plantlets with small roots to be quickly and efficiently planted by an operator by "sandwiching" roots without injury or transplant shock. Essentially, bare-root or unpotted material is instantly converted into a mini-plug or potted format for mechanical transplantation by the apparatus. The specific size/density format handled by the invention can vary to suit different container systems, potting substrate and plant material. While this description relates to a manual operation for plantlet placement, it is contemplated that the task could be automated satisfactorily.

This invention is designed to use pre-rooted plantlets from a variety of sources, including seedlings, rooted cuttings, micropropagation (microcuttings) or somatic embryogenesis (emblings or somatic seedlings). Unrooted material, as either cuttings or micropropagated microcuttings, true or synthetic seed, or embryos can be used with this apparatus as well.

This invention was designed and built as part of a collaborative, multi-year project to scale-up and automate the tissue culture process of somatic embryogenesis (SE). SE involves the production of large numbers of genetically-identical embryos from a parent plant. These embryos can be germinated like true seed and 3 to 6 week old germinants appear very similar to true seedlings (root and shoot)—the resultant plantlets are described as "somatic seedlings" or "emblings". The project involved specifically SE scale-up of spruce picea), but the invention was designed to be used for SE in any plant species as the preferred practice. It may also have application for other types of plant material as described above.

The invention can be used by itself or in conjunction with other machinery. It is assumed that this invention will also be used in consort with conventional greenhouse equipment such as potting substrate mixing machines, pot filling machines, watering lines, delivery conveyors, etc.

The preferred use, and the use to which it is specifically designed in the short term, is with 3–6 week old conifer emblings, which have a 1–5 cm root and good epicotyl development. Larger material can of course be used. These emblings will be presented to an operator at the transfer station. The operator takes these emblings and places them into the open plug members in such a way that the root collar is aligned with the top of the plug member. The invention was designed initially to utilize "STYROBLOCK" containers (STYROBLOCK is a trade-mark of Beaver Plastics, Edmonton, Alberta), which are one of the preferred containers for greenhouse growth of conifer seedlings in Canada. These containers contain plug holes which are approximately 30 cm deep. As the invention creates a 10 cm high mini-plug in the plug member, the container plug holes must only be filled with potting substrate to within 10 cm of the top in order to accommodate the mini-plug at the point of mechanical transplantation.

In summary, the present invention may be considered as providing a method for preparing a plantlet for transportation to a plug container for continued growth of the plantlet into a plant including the steps of transporting a plurality of plantlets to a plantlet transfer station, transporting a plurality of potting substrate-containing plug members to the transfer station, each of the plug members having a plantlet-receiving area delineated therein, transferring each plantlet to the plantlet-receiving area of a corresponding plug member at the station, and closing the plantlet-receiving area to capture the plantlet within the plug member, characterized in that: the plug members are preformed, from a supply of nutrient-rich potting substrate, with a V-shaped notch defining the plantlet-receiving area therein; the transferring step entails placing the plantlet in the notch with a root collar of the plantlet at the edge of the notch so that a stem portion of the plantlet will project from the plug member and a root portion of the plantlet will be aligned in the bottom of the notch; and the closing step involves squeezing the plug member to close the notch about the root portion of the plantlet contained within the notch.

Additionally, the present invention provides apparatus for preparing a plantlet for continued growth of the plantlet into a plant including means for preparing a plurality of plug members, each plug member having a plantlet-receiving area delineated therein, and means for closing the plantlet-receiving area of each plug member following placement of a plantlet thereat, characterized by: (a) the plug member preparing means comprising a plurality of individual cup members, each cup member having a generally C-shaped configuration with a pair of resilient wing members defining an opening therebetween; means for insertion of nutrient-rich potting substrate into the cup members; and means for forming the plantlet-receiving area as a V-shaped notch in each plug member created in each cup member from substrate inserted into the cup member; and (b) the closing means includes tool means for engaging the wing members of the cup members to close the wing members and the plantlet-containing notch in the plug member within each cup member.

COMPARISON TO PRIOR ART

The present invention is distinct from previous patents both in terms of novelty and inventive step. This section compares the present invention to prior art in four categories: 1. plug transplanting, 2. bare root transplanting, 4. fluid drilling, and 4. other plantlet planting systems.

Summary of Comparisons

1. Comparison to Plug Transplanting. Most of the prior art relates to plug transplanting, as opposed to plantlet planting. A plug is defined as a rooted plantlet whose roots are already contained within substrate. The present invention is clearly distinct from these technologies in that the material being planted by the present invention is a bare root plant or unrooted stem section, as opposed to the transplanting of a rooted plantlet contained within a 'plug' of growing substrate.

2. Comparison to Bare Root Transplanting. The present invention is distinct from prior bare root transplanting technology in that the present invention creates a V-shaped notch or plantlet receiving area in a plug which can accurately receive a plantlet in a reference position within the plug to then be placed into a greenhouse container or directly into the field. This is as opposed to bare root transplanting patents which describe means for creating a trench in a field by means of a plough blade and dropping the bare root plants into the trench, and closing the soil back in.

3. Comparison to Fluid Drilling. Fluid drilling involves suspending pre-germinated seeds in a carrier fluid in order to deliver the seeds into the soil behind a plough blade. It is completely different from the present invention for planting bare root plantlets.

4. Comparison to Other Plantlet Planting Systems. The present invention contains distinct structural differences which create a significant incremental step improvement over prior plantlet receiving areas for receiving plantlets in that it creates an "open book" or V-shaped notch of potting substrate, as opposed to two separate halves of potting substrate which are brought together around the plantlets. The V-shaped notch is an important, significant incremental improvement for providing (a) a quick and accurate reference placement for plantlets and/or plantlet roots, (b) support to delicate plantlets roots so that they remain undamaged during the planting process, and (c) alignment of roots within the potting substrate so that they are not bent or broken.

1. Comparison to Prior Art in Plug-Transplanting

The majority of patents reviewed relate to transplanting. "Transplanting" is not the best term to use for this invention; the present invention relates to bare root planting, which in many cases will involve bare rooted plants or unrooted plants which are being planted into potting substrate for the first time.

U.S. Pat. No. 5,048,434 entitled "Transplanting Equipment" describes a device for transplanting existing plants which are already in a potting substrate (plug) into a larger container. This device pulls the plant and the root ball containing substrate out of one container and places it into a large pot with more substrate. The present invention is very different in that the plants utilized by this invention are not in potting substrate. The invention relates primarily to bare root plants, which have been grown in tissue culture, without soil or lifted from a rooting bed in a bare root condition. There is no root ball or plug to transplant. The roots must first be surrounded with soil, but the roots must be supported so they will remain straight and not be damaged.

U.S. Pat. No. 4,932,338 entitled "Transplanting Seedlings Of Nursery Plants Into Beds" describes a device for planting existing plants which are already in soil into a pre-ploughed field. Again the present invention works with bare root plants with no root ball.

Canadian published Application No. 2,005,336 entitled "Transplanting Equipment" describes a device for planting existing plants in soil from trays (usually called plugs, or seedlings) into a pre-ploughed field. Again, the present invention relates to a stage well before this. The present invention is designed to plant very small bare root plants into the soil in a plug container for the first time.

Canadian published Application No. 2,049,329 entitled "Device For Moving Balled Seedlings To The Ground" describes a device for transplanting a plant with a root ball into a larger format container. Again, the present invention deals with a bare root, but this device is similar to the present invention in one respect that the root ball is pushed through a narrow tube or barrel. In the apparatus of the present invention after the root is surrounded with substrate it is pushed into a plug tray in a similar fashion. Several transplant machines obtain proper alignment to engage the root ball of a transplant into a preformed cavity in a new container by using a narrow tube or funnel. Most of the time the plant is pushed through the tube using fingers, compressed air or in the present case a full cylindrical plunger. This operation is used in the present design but the invention relates to how the plant is placed in the substrate, not how the substrate and plant are pushed into the final container.

Canadian Patent No. 1,292,362 entitled "Plant Transplant Mechanism" is a device for transplanting a plant (seedlings with substrate) into a larger format or a pot. In this case a needle is used to pick up the plug root ball. Fingers and a funnel are used to place the plug root ball into the larger pot. The present invention places a bare root into substrate, not plug root balls into larger containers.

Some of the companies building transplanting machines which transplant by picking up the plug root ball include: VISSER in Holland; BOULDIN & LAWSON INC—AUTO-TRANSPLANTER 2000 in USA; WEYERHAEUSER COMPANY, Tacoma, Wash., with the miniplug transplanter; and THE AHRISON TRANSPLANTER in USA.

There are also machines which automatically replace empty (no plant present) plug holes in the greenhouse. Optical systems are used to detect an empty hole. The substrate is removed from the empty plug hole and a new plant, including substrate and the plug root ball is placed in the hole automatically. This is again just a transplanting operation which involves moving the plug root ball, not actually planting a bare root plant.

2. Comparison to Prior Art in Bare Root Transplanting

The procedure used by the present invention is similar to field planting bare root tree seedlings or liners. Bare root tree seedlings are commonly used for reforestation. The trees are grown in an open bed nursery, then they are lifted from the soil by machines similar to potato digging apparatus and the soil is completely removed from the roots to reduce packaging and shipping costs. Equipment has been developed to replant these bare root seedlings in the field. Some hand operated machines use sliding plates for planting, where the root is captured between the plates, the plates are forced into the ground to make a hole, then one plate is removed followed by the other, hopefully leaving the root of the plant in the ground. Other hand operations involve simply plunging a narrow spade into the ground, tipping forward to make an opening into which the bare root is placed. Heavy equipment has also been developed to plot a trench, drop in the bare roots, and close the soil back in. These are all very different from the present apparatus and process which involves a "sandwich" or "open book" concept, where the plantlet is placed on or within a V-shaped notch plantlet-receiving area of a plug member and the "open book" is closed to support, surround and capture the root.

Existing bare root transplanting systems are very crude, and often damage the roots of plants. The present trend in forestry is away from bare root reforestation, in favor of planting seedlings with soil on the roots in the form of a "plug". Containers produce such a plug. Mini-plugs are also being considered as an interim step in growing plugs to improve greenhouse efficiency. Machines are being developed to transplant the mini-plugs into a larger containerized format.

Greenhouse procedures also involve bare root planting, during thinning and filling operations. Thinning involves removing doubles, in cases where two seeds germinate in one plug hole or container. One of the doubles is pulled out, without soil, in a bare root condition. Filling involves planting these seedlings into empty plug holes. The bare root plants pulled out during thinning are often replanted vertically into the empty holes. Bare root planting in this case has some similarities to the present invention, however with the present invention, bare root plants like these are planted into a V-shaped notch or "open book" plug member. In addition, the present invention is designed for a situation where there are thousands of bare root plantlets (seedlings) to be planted instead of select single plants being moved.

The standard greenhouse planting procedure uses a small spatula to open the soil so the root can be pushed in vertically. This is similar to the manual operation presently used in the industry for planting tissue culture generated plantlets. This planting procedure is very labor intensive, plus the root may not remain straight or be planted at the correct depth. Other greenhouses use a fork with prongs which holds the root while it is plunged into the soil. The top of the plant is usually held and the fork pushed down further to cut off the end of the root, so the remaining root is straight and not "S"-shaped. Cutting off the end of the root is not desirable. The present invention solves these problems because the root can be accurately supported and aligned without damage into the V-shaped notch of the plantlet receiving area resulting in little or no planting shock to the plantlet.

3. Comparison to Prior Art in Fluid Drilling

Fluid drilling is a method of planting seeds but it is completely different from the inventive process and apparatus for planting bare root plantlets. Fluid drilling involves suspending pre-germinated seeds in a carrier fluid which is pumped at a controlled rate to meter the seeds into the soil behind a plough blade. The plantlet has not yet emerged from the pre-germinated seed, at most a small amount of root is showing.

U.K. published Application No. 41220/75, entitled "Dispensing Apparatus", describes a typical invention designed to deliver pre-germinated seed via fluid drilling. The present invention differs from this patent in that fluid placement into a final container is not used and the material to be planted can be larger than a pre-germinated seed. Instead, the present invention uses a plug member in the form of an open "sandwich" or "book" to support and enclose the plant material prior to final placement.

4. Comparison to Prior Art in Other Plantlet Planting Systems

A literature search uncovered a number of projects involved with using robots in micropropagation and tissue culture applications. The robots try to pick-up plantlets and push the stems of the plantlets into a substrate (soil), but they have not had much success to date. The robots are too slow, expensive and they tend to damage the plantlets even if a hole is pre-dibbled in the soil. The apparatus of the present invention has an advantage in this area. The root or stem is gently laid into the 'V' shaped notch in the plug member. Instead of pushing the delicate root or stem into the substrate which is the current practice, the root or stem is gently captured by 'closing the open book' of substrate and the root stays straight and undamaged.

There are several machines and patents for automatically dissecting shoot clusters produced from micropropagation.

One of these machines is under development in Holland using a vision system and a laser to cut the plants. This cutting equipment has nothing to do with the present invention.

U.K. patent GB-A-2 014 024 entitled "Cultivating Plants" describes a means for creating at least one continuous envelope containing growing substrate into which the roots of plantlets can be placed. The present invention is distinctly different from this patent in that the present invention creates single plug units of potting substrate which contain V-shaped notch plantlets receiving areas which do not require the use of envelopes through which the roots must grow.

French patent RF-A-2 593 777 entitled "Procede automatique de conditionnement pour jeunes plants horticoles et agricoles et conditionnement ainsi obtenu" describes another means of creating a continuous envelope containing growing substrate into which the roots of plantlets can be placed. This patent is different from the present invention in that this patent does not allow for the plants to be enclosed within the substrate such as via a V-shaped notch or "open book" plug member of preformed substrate but rather the plantlets must be planted directly from above (vertically) into a pre-formed dibble hole.

European patent EP-A-O 086 918 entitled "Continuous moulding machine for producing chains of soil plugs" is similar to the present invention in terms of what it accomplishes, but it is very different in how it functions. Bare root plantlets are placed on strips of paper which have been corrugated into the valleys of mold elements. The bare roots of the plantlets are placed in the mold elements on top of the paper, and substrate is poured over the roots in the hope that some of the substrate will find it way under the roots. A second piece of paper is applied over the top to produce a continuous chain. Pouring loose substrate over the roots to capture them is very different from the present invention where the substrate is pre-moulded into one piece plug members with V-shaped notches and the plantlets are placed into the V-shaped notches. The European apparatus uses two strips of paper to enclose the plantlets which is unlike the present invention. The European apparatus produces a continuous chain of connected plugs, unlike the present invention where the plugs are positioned into plug trays.

Netherlands patent NL-A-9 001 792 entitled "Werkwijze en inrichting voor het samenvoegen van een potvormig lichaam uit kweekmaterial en in dit potvormig lichaam op te kweken groeimateriaal" is similar to the present invention in that substrate is applied to a bare root to capture the bare root, as compared to putting the bare root into substrate. The present invention is different in how the root is supported and how the substrate is applied.

In the Netherlands apparatus a bare root is captured "between" "two separate pieces of substrate", as compare to capturing the bare root by deforming the substrate in a "one piece plug member" to "surround" the root. Equipment exists where a bare root is held in a pot and substrate is applied from two separate sources on either side of the pot to capture the root "between" the two sources of substrate. The Netherlands patent is similar to this except the substrate is moulded into two separate pieces or halves which are pushed together to capture the root "between" them, instead of pouring the substrate in from two separate sources. The present invention uses a one piece plug member and the substrate is deformed around the root to surround the root, not merely compressing it between two flat surfaces. The one piece plug member is moulded as one piece and remains in one piece which also simplifies the moulding operation.

BRIEF DESCRIPTION OF THE DRAWINGS

FIG. 1 illustrates schematically an elevation of apparatus in accordance with the present invention.

FIG. 2 is a plan view of the apparatus of FIG. 1.

FIG. 4 is a schematic elevation of a second embodiment of the apparatus of the present invention.

FIG. 5 is a plan view of the apparatus of FIG. 4.

FIG. 9 is a view of the apparatus of FIG. 7 looking in the direction of the arrow B.

FIG. 12 is a plan view of a third alternative embodiment of the apparatus of the present invention.

FIG. 13 is a schematic elevation of the apparatus of FIG. 12.

FIG. 14 is a schematic elevation of a fourth alternative embodiment of the apparatus of the present invention.

FIG. 15 is a plan view of the apparatus of FIG. 14.

FIG. 16 is a schematic elevation of a fifth alternative embodiment of the apparatus of the present invention.

FIG. 17 is a plan view of the apparatus of FIG. 16.

FIG. 18 is a schematic elevation of a sixth alternative embodiment of the apparatus of the present invention.

FIG. 19 is a plan view of the apparatus of FIG. 18.

DESCRIPTION OF THE PREFERRED EMBODIMENTS

Figure 3:
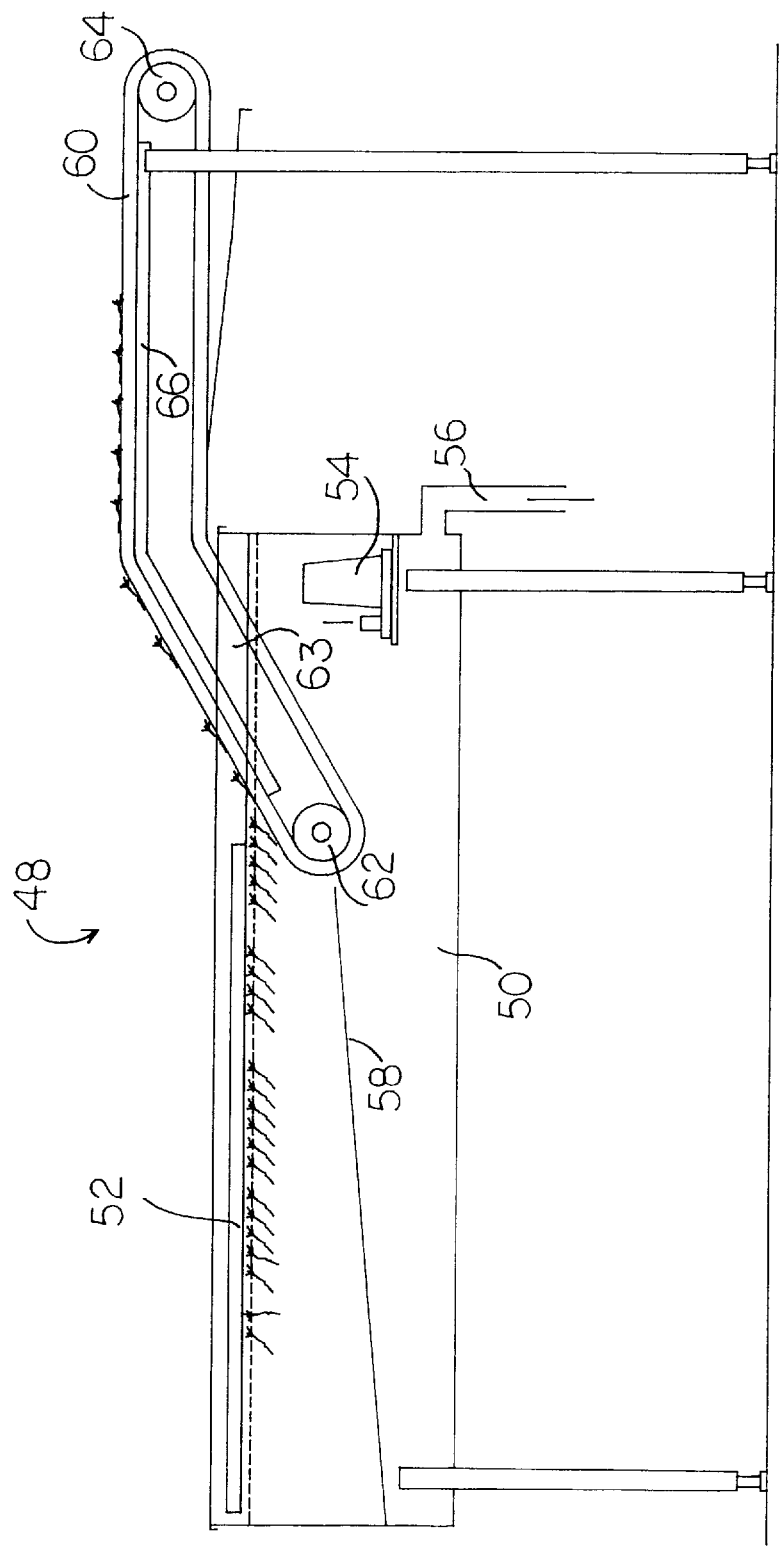
FIG. 3 is an elevation of a structure capable of washing the plantlets and delivering them to the transfer station.

FIGS. 1 and 2 show in a schematic fashion elevation and plan views respectively of apparatus for effecting operation of the process of this invention, namely the insertion of bare root plantlets into substrate-containing plug members for subsequent planting into a plug container where the plantlets can continue development.

The apparatus 10 of FIGS. 1 and 2 includes an elongated conveyor belt 12 entrained about spaced-apart sprockets or pulleys 14, 14 one of which is driven by a suitable electric, pneumatic, or hydraulic motor as is well-known in the art of conveyors. The conveyor belt carries a plurality of adjacent, parallel, elongated C-shaped cups or retaining members 16, each of which is formed from a resilient material such as spring steel. The conveyor belt passes three work stations, identified by the reference numbers 18, 20 and 22.

Figure 6:
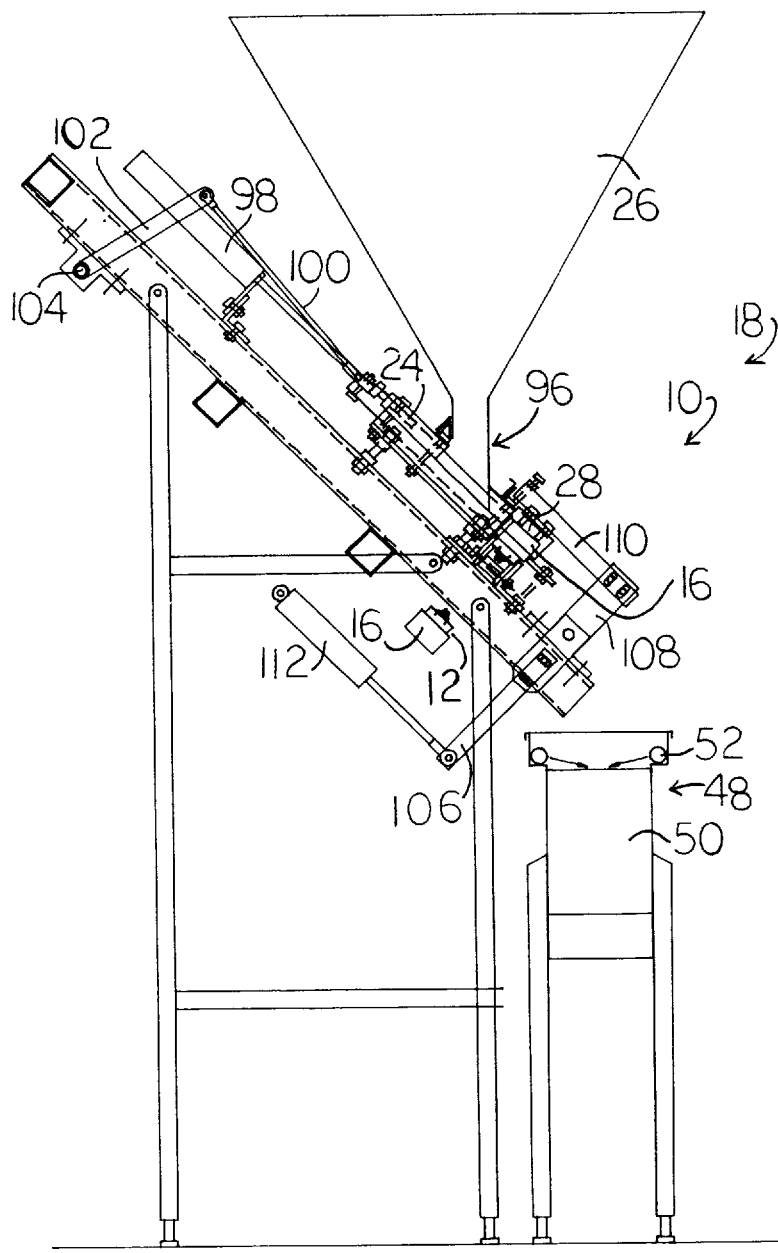
FIG. 6 is an end view of the transfer station of the apparatus of this invention, according to the first embodiment.

At station 18 potting substrate such as moist peat moss is forced by plungers 24 into a group of cups 16 from a hopper 26 (FIG. 6). At the same station moulding members 28 are simultaneously positioned in the opening 30 between the wing members 32 of each cup to create a V-shaped notch 34 in the potting substrate forced into each cup by the plungers 24. The station 20 is the transfer station of the apparatus and it is at this station that an operator takes selected plantlets, delivered to that station in any suitable manner, and places them in respective notches 34 of the plug members 36 conveyed to the station 20 by the conveyor 12. The plug member 36, retained within the cup 16 by the resilient wing members 32 and containing a plantlet P, is illustrated in perspective in FIG. 11A. The plug member 36 is generally cylindrical in shape with the V-notch 34 extending longitudinally thereof. While this description relates to a manual operation for plantlet placement it is contemplated that the task could be automated satisfactorily. An advantage to a manual operation lies in the operator being able to visually inspect each plantlet before it is placed in or on a plug member and discard any that appears to fall short of pre-established criteria.

The work station 22 is a multi-task station. First of all, a lever tool 38 is brought into contact with a group of filled cups 16. The tool 38 has a saw-tooth configuration made up of a plurality of inverted V-shaped notches 40 which are adapted to contact the spaced wing members 32 of each cup 16 so that continued pressure applied by the tool 38 will bring the wing members 32 together, thereby deforming the soil and closing the notches 34 about the plantlets contained therein. While the tool 38 is in its operative position, closing the wing members 32 and the notches 34, a corresponding set of plungers 42, orthogonally oriented with respect to the tool 38, is moved so as to force the plantlet-containing plug members 36 out of their retaining cups 16 into corresponding plug holes 44 of a plug container 46 brought to the work station 22 by a suitable conveyor. The plug container 46 preferably is a container having preformed plug holes therein, such as the previously-mentioned STYROBLOCK planting tray. The structure pertaining to the plungers 24, molds 28, tool 38 and plungers 42 will be described in greater detail with reference to FIGS. 6 to 10 herein below.

FIG. 3 is an elevational view of apparatus 48 which is especially adapted to wash and singulate plantlets and deliver them to the transfer station 20. The apparatus 48 includes a large rectilinear tank 50 which contains an appropriate volume of water. A manifold 52 extends along each upper edge of the tank and is provided with nozzles (not shown) which are angled to direct jets of water towards the surface of the water in the tank 50 and towards one end of the tank. Plantlets which have been grown in tissue culture medium are dropped into the tank 50 and the good plantlets will float on the surface. The jets of water issuing from the manifold 52 will separate the plantlets and wash off the medium. The medium sinks to the bottom of the tank along with defective plantlets and this debris and detritus is pumped from the tank by a pump 54 through an outlet 56 in the end of the tank near the bottom thereof. The pump 54 is used to circulate clean water in the tank to the manifolds 52 so that make-up water is needed only to replace that removed with the garbage discharge. An angled plate 58 within the tank divides the upper and lower portions to help prevent garbage from mixing with the good washed plantlets and to divide the water flow as directed by the nozzles and the pump.

A perforated conveyor belt 60 is entrained about idler sprocket or pulley 62 contained within the tank 50, and drive sprocket or pulley 64 located adjacent to the transfer station 20. The conveyor belt 60 has its orientation altered by the direction-changing plates 66 so that it moves smoothly from any angled orientation at the end of the tank 50 to a horizontal orientation as it approaches the transfer station 20. A plenum 63 located directly behind the conveyor belt at the water surface can be used to apply air vacuum through the belt perforations to assist with plantlet pick up onto the belt. The belt 60 picks up the plantlets directed thereto by the jets of water issuing from the manifolds 52 and moves them to the transfer station 20. A final spray of water may be directed towards the plantlets carried by the conveyor belt 60 to remove any agar remaining thereon. The drive for the conveyor 60 can be controlled by the operator at the transfer station, perhaps by a foot pedal, so that the quantity of plantlets arriving at the station 20 is appropriate to the operator's capabilities.

Figure 11A:
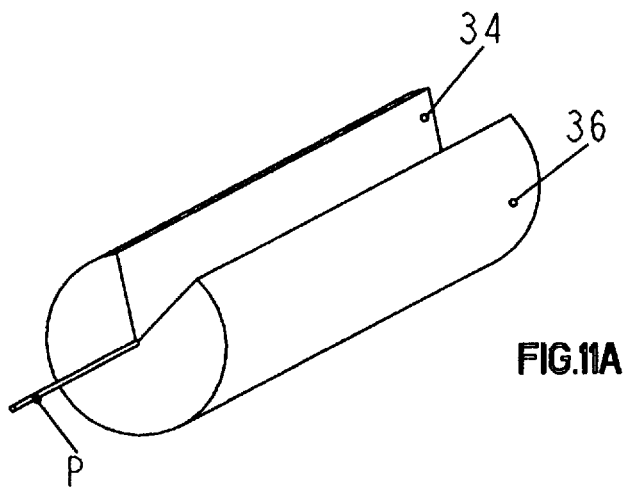
FIG. 11A is a perspective view of a one-piece plug member containing a plantlet prior to and after closing.
Figure 11B:
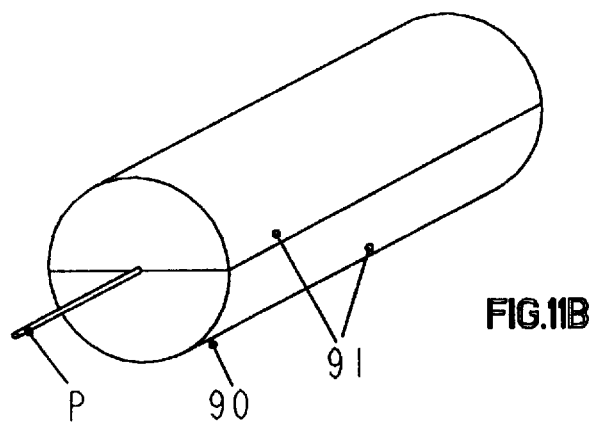
FIG. 11B is a perspective view of a two-piece plug member containing a plantlet prior to and after closing.

FIGS. 4 and 5 illustrate an alternative apparatus 68 which can prepare plug members for receipt of plantlets delivered to the transfer station and then effect closure of the plug members and planting thereof in a plug container. In this case the conveyor belt 70 is entrained about sprockets or pulleys 72,72, one of which is driven, and carries a plurality of adjacent, parallel, elongated plug cups 74, each of which is in the form of a mold having a fixed portion 76 on the conveyor belt and a hinged portion 78 hinged thereto along one side, each mold portion having a generally hemi-cylindrical mold surface 80 therein. At the working station 82 peat moss or other substrate material is moved from a hopper or other source by fingers 84 into the mold portions 76,78 with any excess being removed by the doctor blades 86. At the transfer station 88 the operator takes plantlets conveyed to that station, places one on the exposed surface of each plug half contained within a fixed mold portion 76, and rotates the hinged mold portion 78 so that the mold or cup is closed about the plantlet to capture it in the plug member 90 formed thereby. FIG. 11B shows a plug member 90 with a plantlet P captured between the two hemi-cylindrical halves 91 thereof.

It is important that the operator place the plantlet in or on the plug member with the root collar thereof at the upper end of the plug member and the root held straight in the notch 34 or along the exposed surface of the plug half in the fixed mold portion 76. While this description relates to a manual operation for plantlet placement it is contemplated that the task could be automated satisfactorily. An advantage to a manual operation lies in the operator being able to visually inspect each plantlet before it is placed in or on a plug member and discard any that appears to fall short of pre-established criteria.

This embodiment includes a work station 92 at which a set of plungers 94 is moved so as to force the plantlet-containing plug members 90 out of their retaining cups 74 into corresponding plug holes 44 of a plug container 46 brought to the work station 92 by a suitable conveyor. As the closed, but empty, cups leave the work station 92 they pass around the sprocket or pulley 72 and automatically fall open under the influence of gravity. At the opposite end of the conveyor the movement around the other sprocket or pulley 72 will open the cups further so that the hinged portion 78 will lie on the conveyor belt 70 adjacent to the fixed portion 76 for presentation to the cup filling apparatus at the work station 82.

Figure 7:
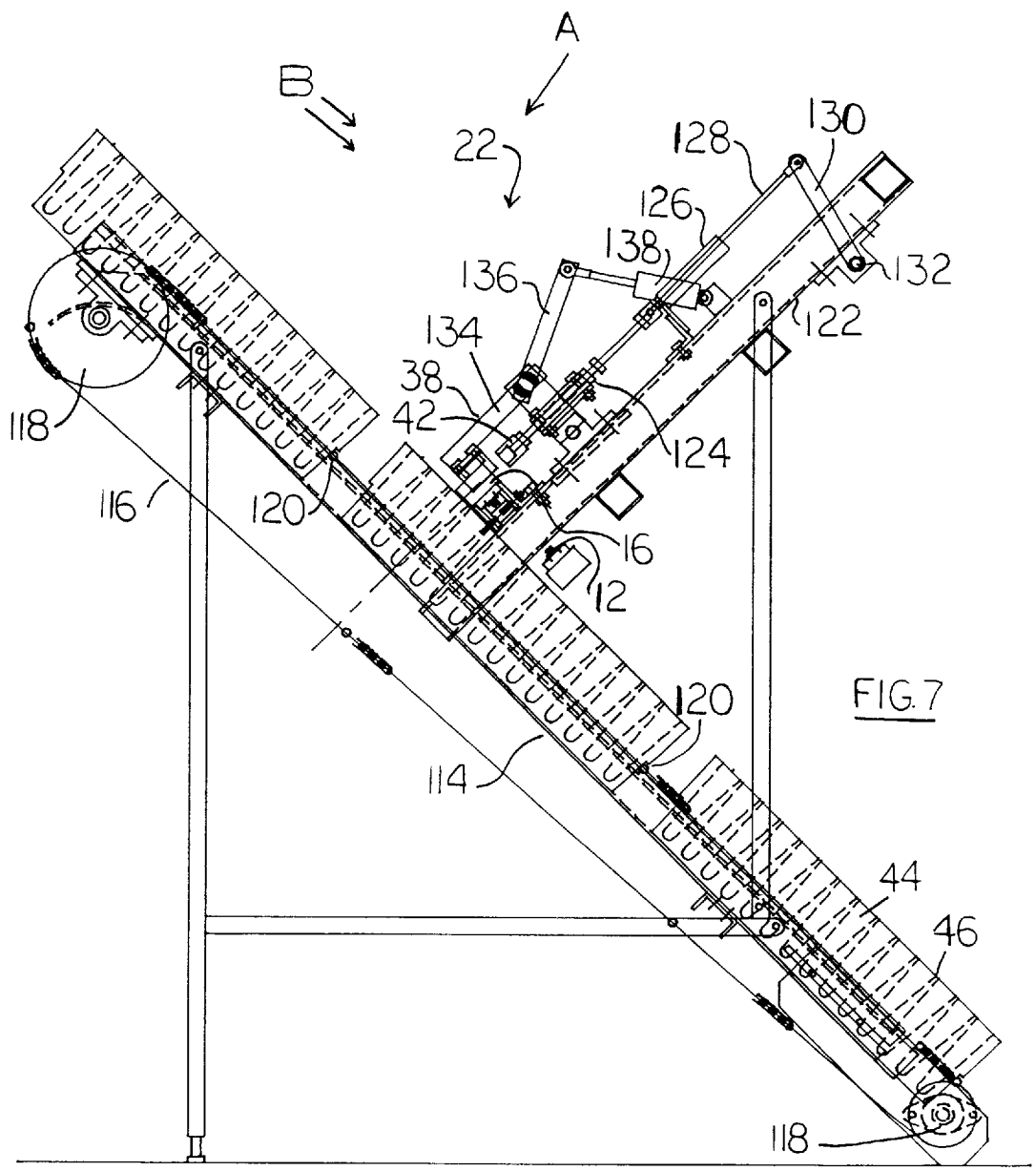
FIG. 7 is an end view of the portion of the apparatus used for transplanting plantlet-containing plug members into plug containers, according to the first embodiment.

FIGS. 6 and 7 will now be described, those figures showing end views of the first apparatus as seen from opposite ends thereof. FIG. 6 shows the plantlet washing and conveying apparatus 48 of FIG. 3 in front of the conveyor apparatus 10, on which the conveyor belt 12 moves, but at an angle of about 45° to the horizontal. The hopper 26 for the nutrient-rich substrate material, such as peat moss, is shown above the conveyor belt 12, the hopper allowing the peat moss to flow downwardly into a moulding head 96 from which the generally cylindrical plungers 24 push the peat moss into the cups 16. The plungers 24 are connected to one or more pneumatic or hydraulic cylinders 98 as well as to connecting rods 100. Each connecting rod 100 is connected to a lever arm 102 at a respective end of the station 18 and the lever arms are connected to a shaft 104 below the apparatus, the shaft 104, lever arms 102, and connecting rods 100 ensuring that the plungers 24 advance and retract evenly. These elements are also shown in FIG. 9.

Each plunger 24 may have a V-shaped notch in the upper surface thereof, corresponding to the shape of the V-notch 34 to be included in each plug member 36. Operation of the mold tool 28 is synchronized so that as the plungers 24 advance to push peat moss into the cups 16 the V-shaped teeth thereof will cooperate with the notches in the plungers to create the V-shaped notch 34 in each plug member. Any excess peat moss is pushed out the back of the cup 16 and is recycled. The tool 28 is attached via levers 106,108,110 to a pneumatic or hydraulic cylinder 112 so that upon actuation thereof the tool 28 will retract from the cups 16 to permit the conveyor 12 to advance with the cups 16 filled with plug members 36 ready to receive plantlets at the transfer station 20. After the group of filled cups 16 has advanced and the conveyor has come to rest, the tool 28 will be lowered into the next set of empty cups so that they can be filled. Since a typical commercially available plug container such as a STYROBLOCK has a matrix of plug holes made up of rows containing eight plug holes each it is preferred that each group of cups and plug members also be made up of eight adjacent cups and plug members.

FIG. 7 shows the apparatus from the opposite end to that of FIG. 6. In particular, this figure shows a conveyor 114 angled at about 45° to the horizontal and including a pair of chains 116 entrained about sprockets 118, 118, one set of which is driven. The chains carry transverse bars 120 against which a plug container 46 can rest so that as the conveyor 114 is operated the containers will be moved upwardly at a 45° angle for presentation of the dibble or plug holes thereof to the work station 22.

A support 122 at 90° to the conveyor 114 mounts the structure for closing the wings 32 of the cups 16 and for pushing the closed plug members 36 into the plug holes 44 of a plug container 46. The plungers 42 are connected for simultaneous movement to a transverse bar 124 which in turn is driven by at least one pneumatic or hydraulic cylinder 126. As with the plungers 24, connecting rods 128, levers 130 and shaft 132 are used to ensure that the plungers advance and retract in perfect unison. The plungers 42 of course are used to push the plug members 36 out of the cups 16 into the plug holes 44 of a plug container 46 presented to the work station 22.

Also seen in FIG. 7 is the tool 38 used to close the wings 32 of each cup 16 at the work station 22. The tool 38 is connected via a pivotable bell crank mechanism 134 to one or more lever arms 136 which in turn are driven by one or more pneumatic or hydraulic cylinders 138. As the cylinders 138 are operated the tool 38 will be rotated downwardly so that the saw-tooth surface thereof will push the wings 32 of each cup towards each other so as to close the cups 16 and bring the sides of each V-notch 34 in each plug member 36 together as well, capturing the plantlet roots in each plug member. With the tool 38 in its operative position the plungers 42 are operated to push the plantlet-containing plug members into the plug container 46.

It is presumed that the plug containers 46 will be provided with the plug holes 44 already formed therein to the correct depth and diameter. If the plug holes are not already provided, the present apparatus could also be provided with a suitable dibbler below and in advance of the work station 22 so as to prepare the necessary plug holes 44.

Figure 8:
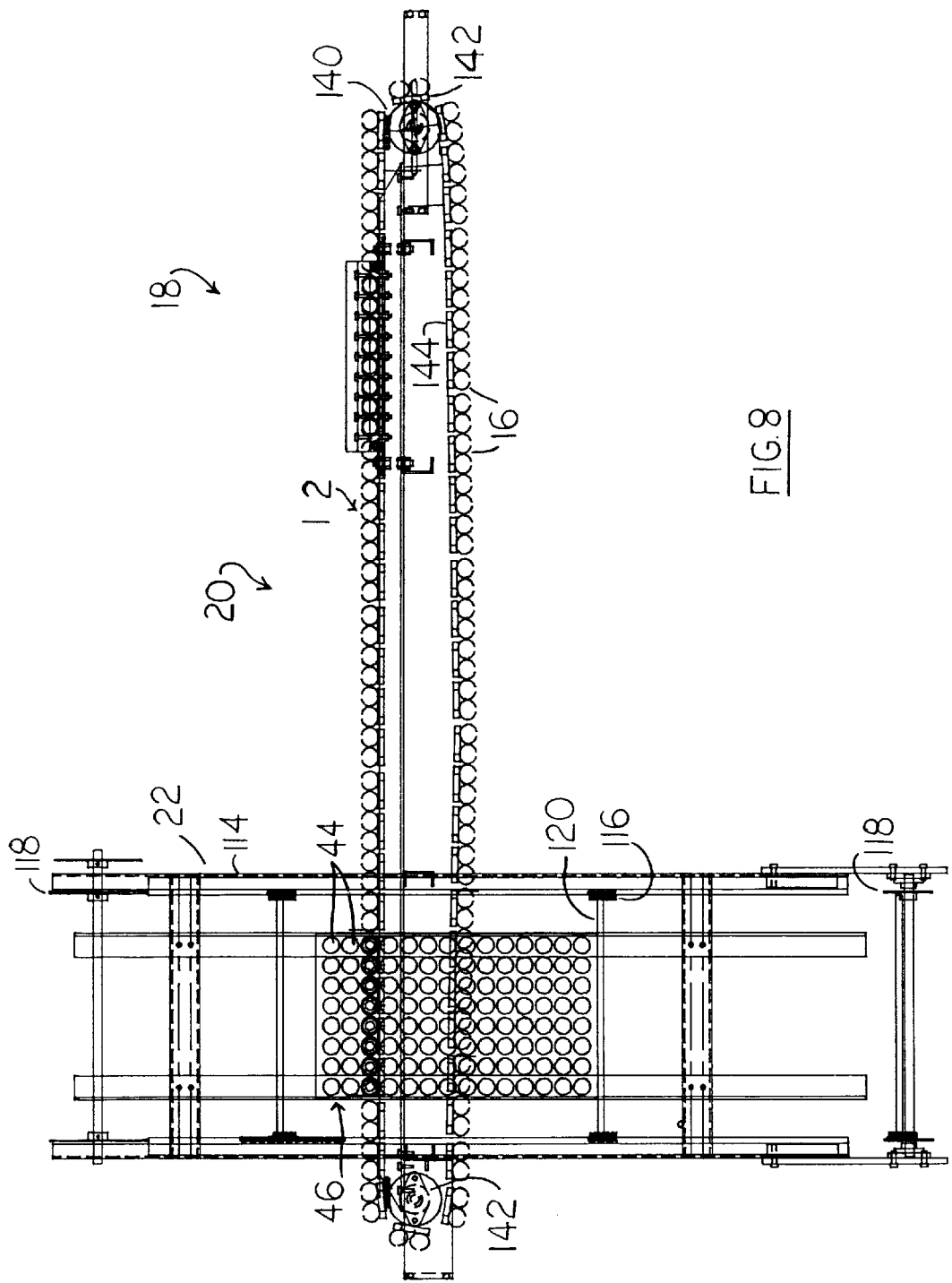
FIG. 8 is a view of the apparatus of FIG. 7 looking in the direction of the arrow A.

FIGS. 8 and 9 show top views of the apparatus of FIGS. 6 and 7 taken along the lines A and B of those figures. In FIG. 8 we see the work station 22 generally in a plan configuration with the conveyor 114 running from bottom to top of the figure. The chains 116, sprockets 118, and bars 120 are illustrated along with a plug container 46 and its matrix of plug holes 44. The conveyor 12 is shown moving cups 16 past the work station 18 at which they are filled with substrate material, and then past the transfer station 20 at which they plug members have plantlets inserted therein. In this more detailed view it is seen that the conveyor 12 includes a chain member 140 entrained about sprockets 142, with the chain mounting thereon short plastic pads 144, each of which carries a pair of cups 16. The pads 144 will move about the sprockets 142 with no problem as the direction of movement thereof changes at each end of the conveyor 12. As previously suggested the cups 16 are preferably arranged in groups of eight to conform to the number of plug holes 44 across a typical plug container 46. When each group is moved to a position above a plug container 46 it is ready to have the plantlet-containing plugs 36 pushed therefrom en mass into the subjacent row of eight plug holes. The conveyor 114 will then advance the plug tray by one row as the next group of eight cups advances from the transfer station 20 whereby that next row in the plug tray can be filled with plantlet-containing plug members.

In FIG. 9 we see the apparatus of the invention in a generally plan configuration but from a 90° different perspective than in FIG. 8. Here, more details of the structure used to fill the cups 16 with substrate material and to push plantlet-containing plug members into the plug holes of a plug container are shown. Thus, at the work station 18 we can see the plungers 24, the cylinder 98, connecting rods 100, lever arms 102 and the shaft 104. We also see the mold tool 28 used to mold the V-notch 34 in the plug member 36. Adjacent the first work station 18 is the mechanism 48 for delivering a succession of plantlets to the transfer station 20, the mechanism being shown only schematically. At the transfer station 20 the operator places a plantlet in the plug member contained in each cup 16 as the conveyor 12 moves the cups to the right in the figure.

Adjacent the transfer station 20 is the second work station 22 at which are seen the plungers 42 used to push the plantlet-containing plug members into the plug holes 44 of a plug container 46. Also seen are the cylinder 126, the connecting rods 128, the lever arms 130, the shaft 132, a plug container 46 and the tool 38 used to close the cups of each group preparatory to the insertion of the plug members thereof into the plug holes.

Figure 10A:
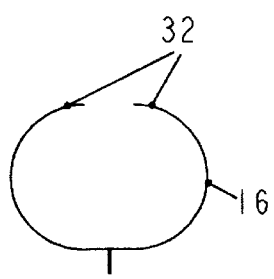
FIGS. 10A through 10F are end views of a plug member showing substrate filling through to closure.
Figure 10B:
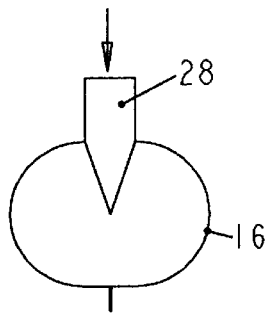
Figure 10C:
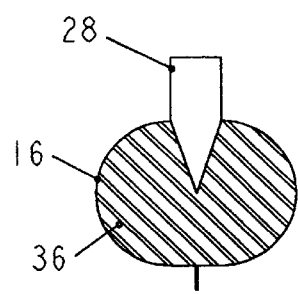
Figure 10D:
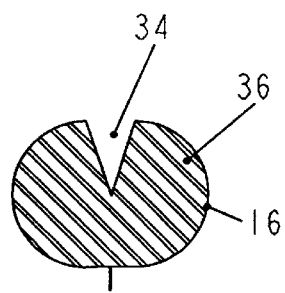
Figure 10E:
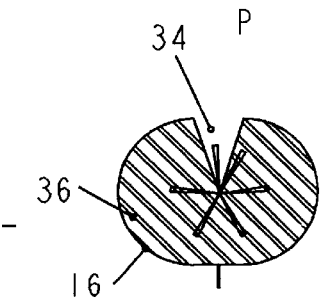
Figure 10F:
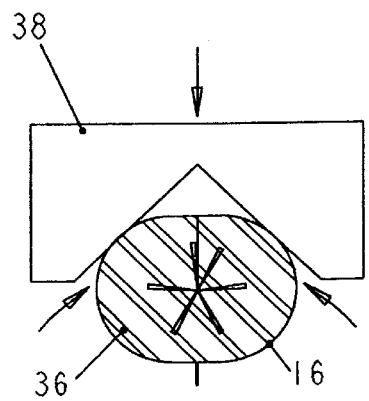

FIGS. 10A through 10F show more end view detail of the sandwich or open book concept of the preferred embodiment of the apparatus of this invention as described in FIGS. 1, 2, 6, 7, 8 and 9. FIG. 10A shows an empty cup 16 with cup wings 32. FIG. 10B shows the moulding tool 28 being inserted into the top of cup 16. FIG. 10C shows substrate such as peat moss pushed into the cup 16 to create the one-piece plug member 36. FIG. 10D shows the moulding tool 28 withdrawn creating the V-notch 34. FIG. 10E shows a plantlet P positioned in the V-notch 34. FIG. 10F shows the closure tool 38 closing the V-notch 34 and capturing the plantlet P by deforming the plug member prior to transplanting into the plug container. FIG. 11A shows the plug member 36 with the V-notch 34 and plantlet P.

FIGS. 12 through 20 illustrate additional alternative embodiments effective in carrying out the process of the invention. FIGS. 12 and 13 illustrate an alternative apparatus 150 which can prepare a polymerized substrate into a continuous plug member format for receipt of plantlets delivered to the transfer station and then effect closure of these plug members and placement into a suitable tray for grow-out. Such a polymerized substrate can consist of peat moss containing polyurethane or other polymerized binders (sometimes referred to in the trade as 'rubber dirt'). Such polymerized binders are typical of that produced by Techniculture, Inc. of USA and called polyterra™, or as produced by Grow-Tech, Inc. of USA.

In this embodiment 150, a magazine 152 containing slabs of polymerized substrate feeds individual slabs 153 through a plurality of saws 154 set so as to incise these slabs without cutting through the entire depth of the slab. These incised slabs 156 are then pushed through a second plurality of saws 158 by a set of plungers 160 actuated by an appropriate mechanism. The saws 158 are set to cut entirely throughout the depth of slab 156 to create incised strips 162 which are received onto a perorated endless belt or conveyor 164 which is entrained about sprockets or pulleys 166, 166, one of which is driven, and carries a series of lugs 168 for transporting the notched strips 162 to the planting station 170.

The planting station 170 contains three rollers 172 designed to hold the incised strips 162 and belt 164 down as they both climb up to a raised perforated roller 174 through which a vacuum is drawn to hold down the notched strip. This roller 174 is designed to open the incisions so as to create notches 176 in the strips 162 to provide receipt of plantlets conveyed to that station. The plantlets are placed into the notch with the root collar thereof at one end of the notch. The rollers 172 then close these notches, capturing the plantlets therein and the strips 162 are conveyed by belt 164 to a plurality of rollers 178. Fingers between these rollers move the strips into a suitable tray 180 for plantlet grow-out.

FIGS. 14 and 15 illustrate an alternative apparatus 190 which can receive polymerized substrate which has been pre-formed into plugs 192 in a plug tray 194, and prepare these plugs for receipt of a plantlet. This preparation for receipt of a plantlet is performed by a pusher or plurality of pushers 196 actuated by an appropriate mechanism, pushing the plug 192 up out of the tray 194 into a saw 198 which cuts a kerf or incision along the length of the plug to about ⅔ of its width as in FIGS. 14B and 15B. After saw 198 retracts as in FIG. 14D and 15C, fingers 200 (not shown in FIG. 14) are inserted into the kerf to spread adjacent portion of the plug member to create the v-notch 210 of the plug member so that a plantlet can be placed inside as in FIGS. 14E and 15D. The fingers 200 close the notch 210 and the plug 192 is reinserted to the tray 194 by a pusher 202.

FIGS. 16 and 17 illustrate an alternative apparatus 220 which can receive one-sided channel trays 222, designed as plug members with one open wall 223. Trays 222 are fed via a magazine onto an endless belt or conveyor 224 which is entrained about sprockets or pulleys, 226, 226, one of which is driven, and carries a series of lugs 228 for transporting the trays 222. A potting substrate 230 such as peat moss is loaded onto the trays and the excess removed by doctor knives 231 prior to and after being formed by a forming wheel 232 which creates a circular depression 234 in each tray cell creating the bottom half of the plug member. Plantlets P are placed in these depressions by the operator or by automated means at the plantlet transfer station 221. Additional substrate 230 such as peat moss is added on top of the cells containing the plantlets creating the top half of the plug member and the excess removed by a doctor knife 233. The planted trays are then racked together into a tray 240 for plantlet grow-out.

FIGS. 18 and 19 illustrate an alternative apparatus 250, similar to apparatus 220. In this case, a double endless belt or conveyor 252, entrained about sprockets or pulleys, 253, 253, one of which is driven, transports plug members in the form of twin trays 254, 255 which are loaded with substrate as per apparatus 220. After plantlets are placed on one of the trays 254 of a pair at plantlet transfer station 251, the other tray 255 in the pair is placed over the top of the first in an automated fashion. These closed pair trays containing plantlets are then automatically racked into a tray 258 for plantlet grow-out.

Figure 20:
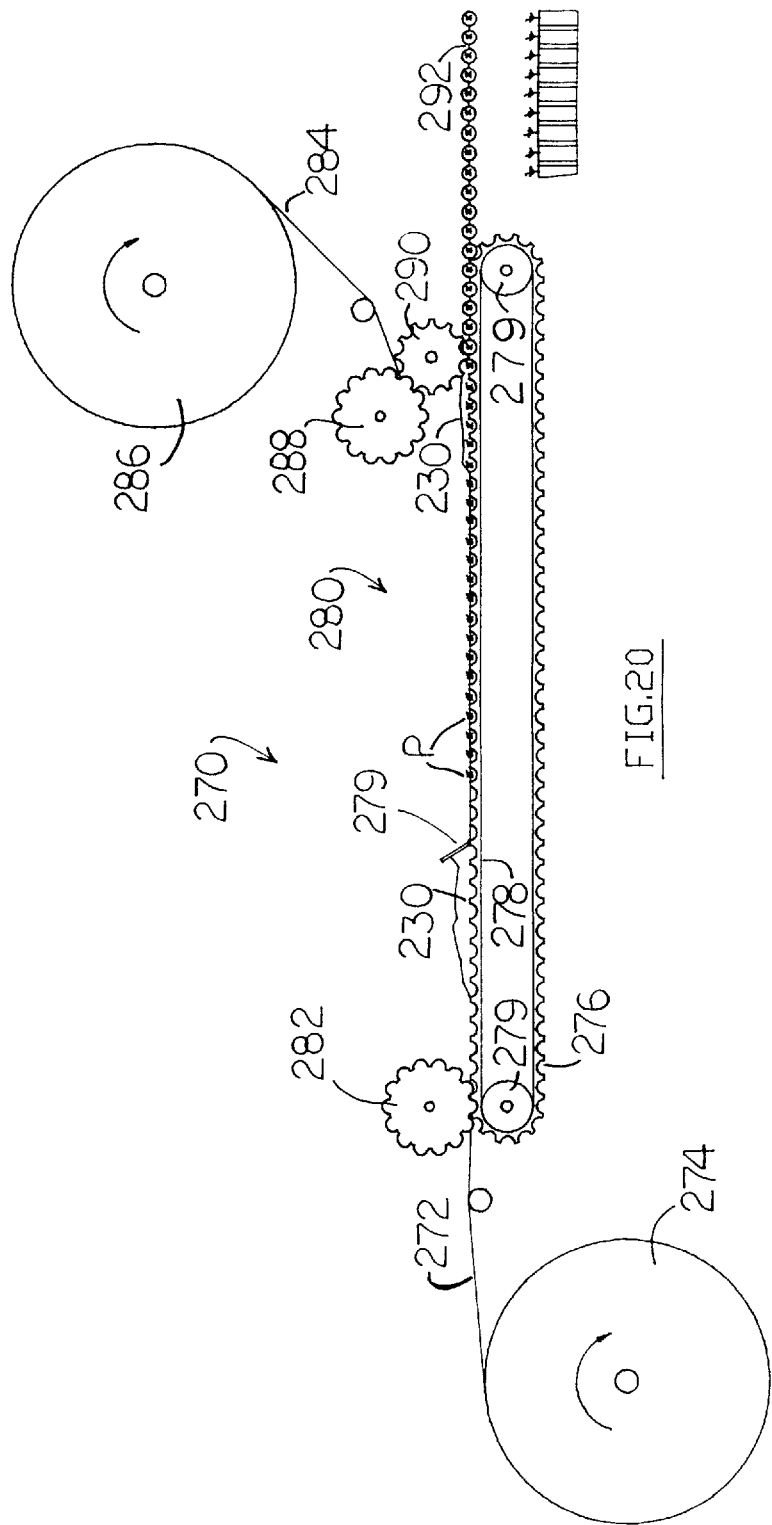
FIG. 20 is a schematic elevation of a seventh alternative embodiment of the apparatus of the present invention.

FIG. 20 illustrates a schematic elevation of an alternative apparatus 270 which uses a paper strip suitable for plant growth to enclose the plantlets into substrate for grow-out. A paper strip 272 fed off a feed roll 274 is pressed into plug member 20 cups 276 contained along an endless belt or conveyor 278, entrained about sprockets or pulleys 279, 279, by a forming wheel 282. A substrate 230 such as peat moss is placed into the paper lined plug member cups 276 and the excess removed with a doctor knife 279. Plantlets P conveyed to the planting station 280 are placed onto the surface of the substrate in the cups 276 and additional substrate 230 is placed on top. This additional substrate is captured by a second paper strip 284, fed off a feed roll 286, through two forming rollers 288, 290. The paper strip is pressed into roller 290 which rolls across the filled cups 276 capturing the additional substrate 230 through heat sealing or gluing the two paper strips together between the cups 292 creating an endless strip of plugs containing plantlets for grow-out.

ADVANTAGES OF THE APPARATUS

The apparatus of this invention reduces the labor required to plant bare root plantlets when compared to the best possible manual system using a spatula or dribbler to open the soil and position the root by hand. The manual labor is kept to a minimum by using the operator for only the inspection and positioning tasks. Positioning the plantlet into the plug member takes a minimum of effort at the ergonomically designed transfer station (20, 88, 170, 190, 221, 251, 280). While this description relates to a manual operation for plantlet placement it is contemplated that the task could be automated satisfactorily. An advantage to a manual operation lies in the operator being able to visually inspect each plantlet before it is placed in or on a plug member and discard any that appears to fall short of pre-established criteria.

The preferred embodiment of the present invention improves the straightness of the root when compared to a manual system. The V-shaped notch holds the root straight so that the root is accurately aligned in the center of the plug member. It is very hard to keep the root straight when planting by hand, and an S-shaped root may break when the full grown plant is pulled from the plug cavity.

The depth of the planting is accurately controlled. The operator can see the root collar and position the collar at the surface of the material of the plug member. It is difficult to accurately position the root collar while manually planting.

Contact with the plug member material is very good. The process of gently sandwiching the root in potting substrate ensures that the full length of the root is in good contact with the potting substrate for proper moisture and nutrient up-take.

The most novel aspect of the machine is the sandwich process where the root is captured between two surface areas of potting substrate. A springy steel cup is used to form the sandwich in the preferred embodiment, but a hinged joint could be used, a series of open trays, or a polymerized substrate could be cut and bent to create a V-notch for a plantlet or two paper strips to create a sandwich. It is the concept of capturing a small delicate root between two preformed surface areas of nutrient-rich potting substrate that is significant to the present invention.

The foregoing has described the present invention in terms of seven forms of apparatus that are effective in carrying out the process of the invention. It is understood that a skilled practitioner could alter the apparatus, or the process, without departing from the spirit of the invention. Accordingly the protection to be afforded the invention is to be determined from the scope of the claims appended hereto.

It is claimed:

1. Apparatus (10) for planting a plantlet in a plug container for continued growth of the plantlet into a plant including first conveyor means (48) for transporting a succession of plantlets (P) to a plantlet transfer station (20), second conveyor means (12) for transporting a succession of plug members (36) to said transfer station, each said plug member having a plantlet-receiving area delineated therein, means for closing the plantlet-receiving area of each plug member following placement of a plantlet (P) thereat, and means (42) for transferring each plantlet-containing plug member (36) to a plug container (46), characterized by: (a) said second conveyor means carrying a succession of individual cup members (16) thereon, each said cup member having a generally C-shaped configuration with a pair of resilient wing members (32) defining an opening (30) therebetween; means (26,24) for insertion of nutrient-rich potting substrate into said cup members (16); and means (28) for forming said plantlet-receiving area as a V-shaped notch in each plug member (36) created in each cup member (16) from substrate inserted into the cup member; and (b) said closing means includes tool means (38) for engaging the wing members (32) of said cup members (16) to close said wing members and the plantlet-containing notch (34) in the plug member (36) within each cup member.

2. Apparatus (10) for planting a plantlet in a plug container (46) for continued growth of the plantlet into a plant including first conveyor means (48) for transporting a succession of plantlets (P) to a plantlet transfer station (20), second conveyor means (12) for transporting a succession of plug members (36) to said transfer station (20), each said plug member having a plantlet-receiving area delineated therein, means for closing the plantlet-receiving area of each plug member following placement of a plantlet thereat, and means (42) for transferring each plantlet-containing plug member (36) to the plug container (46), characterized by: (a) said second conveyor means carrying a succession of individual cup members (16) thereon, each said cup member having a generally C-shaped configuration with a pair of resilient wing members (32) defining an opening (30) therebetween; (b) means (26,24) at a first work station (18) ahead of said transfer station (20) for insertion of nutrient-rich potting substrate into cup members (16) brought to said first work station by said second conveyor means; (c) means (28) at said first work station (20) for forming said plantlet-receiving area as a V-shaped notch in each plug member (36) created in each cup member (16) from substrate inserted into the cup member; (d) said closing means includes tool means (38) having a plurality of notches (40) for engaging the wing members (32) of said cup members (16) to close said wing members and the plantlet-containing notch (34) in the plug member (36) within each cup member; and (e) said transferring means includes plunger means (42) for pushing plantlet-containing plug members (36) from their cup members (16) into corresponding plug holes (44) of a plug container (46).

3. Apparatus according to claim 2 characterized in that said second conveyor means (12) includes an endless belt carrying said cup members (16), said belt being entrained about a pair of pulleys (14,14), one of which is driven so as to move said cup members (16) to and from said transfer station (20).

4. Apparatus according to claim 3 characterized in that said insertion means includes a hopper (26) for nutrient-rich potting substrate and a plunger (24) for inserting such substrate from said hopper (26) into the cup members (16).

5. Apparatus according to claim 4 characterized in that said forming means (28) has a V-shaped configuration that is positionable in said cup opening (30) to form said V-shaped notch in the substrate contained within the cup member.

6. Apparatus according to claim 5 characterized by means (98–112) for synchronizing movement of said plunger means (24) and said forming means (28).

7. Apparatus according to claim 3 characterized in that said tool means (38) and said plunger means (42) are provided at a second work station (22) following said transfer station (20).

8. Apparatus according to claim 7 characterized by means (126–138) for synchronizing movement of said plunger means (42) and said tool means (38).

9. A method for preparing a plantlet for transportation to a plug container for continued growth of the plantlet into a plant comprising the steps of:

transporting via first conveyor means a plurality of plantlets to a plantlet transfer station, transporting via second conveyor means a plurality of potting substrate-containing plug members to said transfer station, each of said plug members having a plantlet-receiving area delineated therein;

transferring each plantlet to the plantlet-receiving area of a corresponding plug member at said station; and closing said plantlet-receiving area to capture said plantlet within said plug member, said plug members being preformed, from a supply of nutrient-rich potting substrate, with a V-shaped notch defining the plantlet-receiving area therein; said transferring step entailing placing the plantlet via transfer means in the notch with a root collar of the plantlet at the edge of the notch so that a stem portion of the plantlet will project from the plug member and a root portion of the plantlet will be aligned in the bottom of the notch; and said closing step involving squeezing said plug member via tool means to close the notch about the root portion of the plantlet contained within the notch.

10. The method of claim 9 including the step of transplanting each plantlet-containing plug member into a plug container for continued growth of the plantlet into a plant in the container.

* * * * *